(12) United States Patent
Isono et al.

(10) Patent No.: US 10,518,494 B2
(45) Date of Patent: Dec. 31, 2019

(54) BLEEDER CORD AFFIXING DEVICE AND METHOD

(71) Applicant: BRIDGESTONE CORPORATION, Tokyo (JP)

(72) Inventors: Taizo Isono, Tokyo (JP); Tomohiro Hoshiba, Tokyo (JP); Tomoo Hanesaka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 373 days.

(21) Appl. No.: 15/119,607

(22) PCT Filed: Feb. 23, 2015

(86) PCT No.: PCT/JP2015/055044
§ 371 (c)(1),
(2) Date: Aug. 17, 2016

(87) PCT Pub. No.: WO2015/129627
PCT Pub. Date: Sep. 3, 2015

(65) Prior Publication Data
US 2017/0050396 A1 Feb. 23, 2017

(30) Foreign Application Priority Data
Feb. 27, 2014 (JP) .................................. 2014-036120
Mar. 10, 2014 (JP) .................................. 2014-046643

(51) Int. Cl.
*B29D 30/38* (2006.01)
*B29D 30/46* (2006.01)
(Continued)

(52) U.S. Cl.
CPC ............. *B29D 30/38* (2013.01); *B29D 30/46* (2013.01); *B29C 70/20* (2013.01); *B29D 30/42* (2013.01);
(Continued)

(58) Field of Classification Search
CPC .. B29D 30/38; B29D 30/46; B29D 2030/381; B29D 2030/488; B29D 30/42; B29D 2030/421; B29C 70/20
(Continued)

(56) References Cited

U.S. PATENT DOCUMENTS 1,742,777 A * 1/1930 Midgley ................. B29C 70/06
156/179
5,573,616 A * 11/1996 De Roeck ............ B65H 19/283
156/185
(Continued)

FOREIGN PATENT DOCUMENTS

EP 1985561 A1 10/2008
GB 649335 A * 1/1951 ............. B29C 70/16
(Continued)

OTHER PUBLICATIONS

Jan. 23, 2017 Search Report issued in European Patent Application No. 15755123.5.

*Primary Examiner* — Robert C Dye
*Assistant Examiner* — Sedef E Paquette
(74) *Attorney, Agent, or Firm* — Oliff PLC (57) ABSTRACT

A bleeder cord affixing device is made up of an affixing roller extending in a width direction of the treatment member and adapted to be pressed into the treatment member being moved, thereby to be rotated; and a roller moving mechanism that moves the affixing roller to and away from the treatment member. The roller moving mechanism operates to move the affixing roller to a pressed position urged to the treatment member, with a result that the affixing roller is caused to be rotated due to the movement of the treatment member at the pressed position and attaches the rubber member to the treatment member under the pressing force, and then presses the bleeder cords onto the treatment mem-
(Continued)

ber to continuously affix the bleeder cords onto the surface of the treatment member.

8 Claims, 8 Drawing Sheets

(51) Int. Cl.
 *B29D 30/48* (2006.01)
 *B29C 70/20* (2006.01)
 *B29D 30/42* (2006.01)
(52) U.S. Cl.
 CPC .. *B29D 2030/421* (2013.01); *B29D 2030/488* (2013.01)
(58) Field of Classification Search
 USPC .............................. 156/117, 133, 397; 83/452
 See application file for complete search history.

(56) References Cited

U.S. PATENT DOCUMENTS

| | | | |
|---|---|---|---|
| 7,998,298 B2* | 8/2011 | Tatara | B29C 43/24 156/179 |
| 2006/0174998 A1 | 8/2006 | Takagi et al. | |
| 2008/0314216 A1* | 12/2008 | Delgado | B29D 30/1635 83/452 |
| 2009/0249598 A1 | 10/2009 | Tatara et al. | |
| 2010/0031725 A1* | 2/2010 | Yamane | B21B 17/14 72/252.5 |

FOREIGN PATENT DOCUMENTS

| | | |
|---|---|---|
| JP | H07-164555 A | 6/1995 |
| WO | 2013/088269 A1 | 6/2013 |

* cited by examiner

BLEEDER CORD AFFIXING DEVICE AND METHOD

TECHNICAL FIELD

The present invention relates to a device for and a method of affixing bleeder cords, in the form of bleeder threads, to a treatment member, which is a belt-shaped rubber member such as a carcass ply or a belt member forming a tire structural element.

BACKGROUND ART

Tire manufacturing process involves a problem that air is collected or captured between treatment members used in the tire structure. For the purpose of solving this problem, it has heretofore been a practice to affix bleeder cords of cotton threads in rows spaced apart a predetermined distance, to a surface or opposite surfaces of the treatment member (refer, for example, to Patent Document 1).

PRIOR ART DOCUMENT

Patent Document

Patent Document 1: JP H02-299903 A

In the air tire disclosed in Patent Document 1, bleeder cords made of spun polyester yarn of a predetermined thickness are applied or affixed to a surface or opposite surfaces of a carcass ply and/or a belt member, for the purpose of suppressing generation of air masses and preventing production of low-quality regions containing air, by making the bleeder cords transmit or absorb air (gas) masses produced during the tire production process and by lowering humidity absorbing character.

When the bleeder cords are applied or affixed to the treatment member, it is dangerous for the operator to manually affix the bleeder cords to the treatment member continuously moving in the treatment member feeding line. For this reason, heretofore, the operation of the treatment member feeding line was temporarily stopped, and the operator used to attach a common tip rubber piece of strip with adhesive nature to the leading ends of the bleeder cords that are arranged in rows by a bleeder cord arranging device. After the tip rubber piece is attached commonly to the leading ends of the bleeder cords, the operator manually attached the tip rubber piece onto the surface of the treatment member. Thereafter, the operation of the treatment member feeding line was resumed to continuously feed the treatment member, so that the bleeder cords were pulled by the common tip rubber piece attached to the treatment member being fed in such a manner that the bleeder cords extend along the surface of the treatment member and are arranged in rows by the bleeder cord arranging device. At a location downstream of the treatment member feeding line, is provided a device, such as a guide roll, for converting the treatment member feeding direction, and the bleeder cords arranged in rows were pressed against and affixed to the surface of the treatment member by the action of the treatment member feeding direction converting device. After one lot of the treatment member was affixed with the bleeder cords, the operator manually used to cut with scissors the trailing ends of the bleeder cords having been affixed in rows to the treatment member while the treatment member feeding line was maintained in operation.

DISCLOSURE OF THE INVENTION

Underlying Problem to be Solved by the Invention

As described above, the bleeder cord affixing operation heretofore performed had the disadvantage that the treatment member feeding line for continuously moving the treatment member had to be once stopped after the operation for one lot of the treatment member, with resultant reduction of operational efficiency so that improvement of productivity cannot be expected. Furthermore, the operator had to use a manual cutter such as scissors to cut the bleeder cords while the treatment member feeding line is in continuous operation in which the treatment member is fed continuously and the bleeder cords are being pulled thereby. Therefore, sufficient safety was not ensured. If the operation of the treatment member feeding line were stopped, the bleeder cord cutting operation would be safe but the productivity would be lowered.

The present invention has been made in view of the foregoing, and the object of the invention is to provide a bleeder cord affixing device and method in which the bleeder cords can be affixed to the treatment member with safety without stopping the continuous operation of the treatment member feeding line for moving the treatment member, thus attaining improvement in productivity.

Another object of the present invention is to enable safe cutting of the trailing end portions of the bleeder cords without stopping the continuous operation of the treatment member feeding line for moving the treatment member, thus attaining an improvement in productivity.

Means for Solving the Underlying Problem

To attain the above objects, the present invention provides a bleeder cord affixing device comprising: a treatment member feeding device for feeding a treatment member in a direction; an affixing roller disposed to extend in a breadth direction across the direction in which the treatment member is fed; a bleeder cord arranging device for guiding and arranging a plurality of bleeder cords with leading ends of adhesive nature in parallel rows along the direction in which the treatment member is fed; and an affixing roller moving mechanism rotatably supporting the affixing roller thereon and being operative to move the affixing roller between a pressed position in which the affixing roller is pressed onto the treatment member being fed, to cause the affixing roller to be rotated due to friction with the treatment member being fed, and a standby position in which the affixing roller is moved away from the treatment member; the affixing roller moving mechanism being configured to move the affixing roller in the standby position to the pressed position onto the treatment member being continuously fed, in a state in which the leading ends of adhesive nature of the bleeder cords arranged by the bleeder cord arranging device are attached to an outer surface of the affixing roller, and to cause the affixing roller to rotate due to friction with the treatment member to thereby press the leading ends of adhesive nature of the bleeder cords onto the treatment member so as to affix and adhere the bleeder cords continuously to the treatment member.

The affixing roller may be configured to be rotatable in one direction only, which direction is a direction in which the affixing roller is rotated due to the friction with the treatment member, created when the affixing roller is pressed on the treatment member being continuously fed.

According to a preferred embodiment of the invention, there is provided a rotation preventing device for preventing rotation of the affixing roller when the affixing roller is in the standby position.

Preferably, the affixing roller has an outer cylindrical surface including circumferentially alternately arranged regions of a low surface roughness and a high surface roughness greater than the low surface roughness.

The affixing roller moving mechanism may include a pivot shaft, swing arms having proximal ends rotatably supported by the pivot shaft and extending from the proximal ends to distal ends on which the affixing roller is rotatably supported, the swing arms being swingable to move the affixing roller between the standby position away from the treatment member and the pressed position pressed on the treatment member.

In a preferred embodiment of the invention, the direction in which the treatment member feeding device feeds the treatment member is reverse to the direction in which the bleeder cords guided and arranged by the bleeder cord arranging device are fed by the rotation of the affixing roller.

In a further preferred embodiment of the invention, the pivot shaft of the affixing roller moving mechanism is mounted on the bleeder cord arranging device, and the swing arms extend in a direction including a directional component in which the bleeder cords guided and arranged by the bleeder cord arranging device are fed by the affixing roller.

In a preferred embodiment of the invention, there is provided a bleeder cord cutting device for cutting trailing end portions of the bleeder cords, which have been affixed to the treatment member by the bleeder cord affixing device; wherein: the bleeder cord cutting device is provided with a bleeder cord clamping mechanism, including; pairs of opposing clamping plates between which are passed the trailing end portions of the bleeder cords extending from the bleeder cord arranging device and affixed to the treatment member, a drive member connected to one of the opposing clamping plates of each pair so as to move the one clamping plate toward the other clamping plate to clamp the trailing end portions of the bleeder cords between the opposing clamping plates, and a resilient member disposed between the drive member and the one clamping plate of each pair; the drive member connected to the one clamping plate of each pair has thereon a cutter with a cutting blade directed toward the other clamping plate and the trailing end portions of the bleeder cords; the one clamping plate of each pair is normally made to protrude toward the other clamping plate beyond the cutting blade of the cutter by the force of the resilient member; and the bleeder cord clamping mechanism and the cutters are configured to operate such that, when the clamping plates of each pair, clamping the bleeder cords therebetween, are urged against each other by the operation of the drive member accompanied by compression of the resilient member, the cutting blade of the cutter fixed to the drive member is caused to project beyond the one clamping plate thereby to cut the bleeder cords.

According to a further preferred form of the invention, the one clamping plate is a movable clamping plate to be acted upon by the drive member via the resilient member and the other clamping plate is a stationary clamping plate; and the cutter connected to the drive member is adapted to move and project along a lateral side of the movable clamping plate toward the stationary clamping plate beyond clamping faces of the movable and stationary clamping plates.

The stationary clamping plate may be configured to be rotatable about a support shaft between a closed attitude opposing the movable clamping plate and an open attitude not opposing the movable clamping plate.

The present invention further provides a bleeder cord affixing method comprising the steps of: feeding a treatment member in sheet form in a direction; arranging a plurality of bleeder cords, having leading ends of adhesive nature, in rows extending in directions along the direction of feeding the treatment member; attaching leading ends of the bleeder cords onto an outer surface of an affixing roller extending across the direction of feeding of the treatment member and along the treatment member; moving the affixing roller from a standby position away from the treatment member to a pressed position in which the affixing roller is pressed onto the treatment member, thereby to cause the outer surface of the affixing roller to be pressed against the treatment member and to cause rotation of the affixing roller due to the feeding of the treatment member; causing the leading ends of adhesive nature of the bleeder cords to be pressed onto and attached to the treatment member due to the rotation of the affixing roller pressed onto the treatment member; and causing the bleeder cords to be pressed against and affixed to the treatment member by the rotation of the affixing roller due to the feeding of the treatment member, thereby to continuously affix the bleeder cords to the treatment member.

The affixing roller may be moved by swinging movement about a pivot shaft between the standby position and the pressed position.

The leading ends of adhesive nature of the bleeder cords may be formed by a tip rubber piece commonly attached to the leading ends of the bleeder cords.

After the bleeder cords are affixed continuously to the treatment member, trailing end portions of the bleeder cords having been affixed to the treatment member can be cut from succeeding portions of the bleeder cords. The trailing end portions of the bleeder cords affixed to the treatment member can be cut by clamping the trailing end portions between opposing pairs of clamping plates under resilient clamping force and by protruding cutters against the resilient clamping force from one of the clamping plates toward the other clamping plate.

Effect of the Invention

According to the device and method of the invention, the affixing roller moving mechanism operates to move the affixing roller in the standby position away from the treatment member, in a state in which the leading ends of adhesive nature of the bleeder cords arranged in rows by the bleeder cord arranging device are attached commonly to the outer surface of the affixing roller, to the pressed position in which the affixing roller is pressed against the treatment member being fed. The affixing roller is rotated in the pressed position by the feeding movement of the treatment member, thereby to press and affix the adhesive leading ends of the bleeder cords onto the treatment member. Thereafter, the affixing roller operates to continuously press and affix the bleeder cords to the surface of the treatment member. It is therefore possible to reliably affix the bleeder cords on the treatment member being fed continuously without stopping the operation of the treatment member feeding line, whereby an improvement is attained in productivity.

According to the preferred embodiment of the bleeder cord affixing device of the invention, the affixing roller is rotated in one direction only due to the friction created by contact of the affixing roller with the treatment member being continuously fed. For this reason, the affixing roller is prevented from its reverse rotation by being pulled by the bleeder cords, when the affixing roller is moved to the pressed position against the treatment member with the adhesive tip ends of the bleeder cords attached in a predetermined area of the outer surface of the affixing roller. Therefore, the adhesive tip ends of the bleeder cords can be readily attached to the treatment member by the pressing operation of the affixing roller with the attached position of the adhesive tip ends maintained as predetermined.

The affixing roller is prevented from rotation by the rotation preventing device when the affixing roller is in the standby position away from the continuously moving treatment member. Therefore, it is ensured to maintain the predetermined position of the adhesive tip ends of the bleeder cords on the outer surface of the affixing roller at the standby position, the affixing roller is prevented from unintended rotation at the standby position, and the adhesive tip ends are kept reliably attached to the treatment member.

The outer surface of the affixing roller may include circumferentially alternately arranged regions of a low surface roughness and a high surface roughness greater than the low surface roughness. When the tip rubber tape commonly attached to the leading ends of the bleeder cords is attached to the outer surface of the affixing roller, the tip rubber tape is immovably attached to the regions of low surface roughness, and when the affixing roller rotated by the feeding movement of the treatment member operates to press and attach the leading ends of the bleeder cords to the treatment member, the regions of high surface roughness functions for the leading ends of the bleeder cords to be easily peeled off the affixing roller, whereby the attachment of the leading ends of the bleeder cords to the treatment member can be smoothly carried out.

The affixing roller moving mechanism includes the swing arms having proximal ends swingably supported by the pivot shaft and extending upward from the proximal ends to distal ends on which the affixing roller is rotatably supported, and the swing arms are swingable to move the affixing roller between the standby position away from the treatment member and the pressed position pressed on the treatment member being moved continuously. Therefore, the attachment of the leading ends of the bleeder cords can be made easily on the upper portion of the outer surface of the affixing roller in the rear-side standby position. When the swing arms are swung to the front-side to move to the pressed position, the leading ends of the bleeder cords attached to the upper portion of the outer surface of the affixing roller are moved from upwardly directed position to a position directed sidewise to confront the surface of the treatment member being fed downward, so that the leading ends of the bleeder cords are pressed by the affixing roller and affixed to the treatment member.

Thus, the operation of attaching the leading ends of the bleeder cords to the outer surface of the affixing roller is easy and can be carried out in a reliable manner with a simple construction.

According to the bleeder cord cutting device, when the clamping plates of each pair, gripping or clamping the bleeder cords by the operation of the bleeder cord clamping mechanism, are urged against each other as a result of compressing the resilient member by means of the drive member, the cutter fixedly mounted to the drive member is caused to project and cuts the bleeder cords at their trailing end portions that extend from the clamping faces of the clamping plates. Therefore, the trailing end portions of the bleeder cords can be cut easily and reliably, while the treatment member is being fed, without stopping the continuous operation of the treatment member feeding line. More particularly, the trailing end portions of the bleeder cords are pulled out from the clamping faces of the clamping plates and affixed to the treatment member in connection with the feeding movement of the treatment member, the trailing end portions of the bleeder cords are subjected to tension when they are being pulled out from the clamping faces pressed against each other by the drive member, and immediately thereafter the cutter is projected to reliably cut the tensioned trailing end portions of the bleeder cords.

Among the clamping plates of each pair, one is the stationary-side clamping plate at a fixed position and the other is the movable-side clamping plate adapted to be moved via the resilient member by the drive member. The movable-side clamping plate has the cutter fixedly mounted on the drive member and operates to cut the bleeder cords by projecting along the side of the movable-side clamping plate toward the stationary-side clamping plate beyond the clamping faces of both the clamping plates. Only the movable-side clamping plate is thus driven so that the cord clamping mechanism is simplified. Moreover, high safety is assured because the cutter is projected along the side of the movable-side clamping plate.

The tip rubber pieces to be commonly attached to the leading ends of the bleeder cords are preliminarily attached to the clamping faces of each pair of the clamping plates, and the trailing end portions of the preceding lot of the bleeder cords are gripped and clamped by the tip rubber pieces attached to the clamping faces of each pair of the clamping plates and then cut off from the succeeding bleeder cords by the cutter. This clamping and cutting operation results in attaching the tip rubber piece to the leading ends of the succeeding bleeder cords. Therefore, by preliminarily attaching the tip rubber piece for the succeeding lot of the bleeder cords on the paired clamping faces of the clamping plates while preparing for the affixing of the preceding lot of the bleeder cords to the treatment member, the operation of attaching the tip rubber piece to the leading ends of the bleeder cords of each lot can be made efficiently without stopping the feeding operation of the treatment member.

The stationary-side clamping plate is made swingable about the support shaft between the closed attitude directed to the movable-side clamping plate and the open attitude. The tip rubber tape can be easily attached to the clamping face of the stationary-side clamping plate when the latter is in the open attitude, whereby the operation of attaching the tip rubber tape to the clamping face of the stationary-side clamping plate can be carried out efficiently.

BEST MODE FOR CARRYING OUT THE INVENTION

Preferred embodiments of the present invention will be described with reference to FIGS. 1 to 11.

A material T to be treated, used in the illustrated embodiment of the invention is a carcass ply, which is a rubber material in the form of a belt in which steel cords or resin cords are embedded. A carcass ply is produced by a rolling process in which steel cords or resin cords arranged in rows are passed in a calendar roll to be applied with rubber layers on upper and lower sides thereof to be embedded in a rubber belt.

The material T for treatment ("treatment member T" hereafter) thus produced is divided into lots, and a plurality of lots of the treatment member T are connected together in series on a liner material. Such lots of the treatment member T are supplied successively into a bleeder cord affixing device 20 in a treatment member feeding line or device. In the bleeder cord affixing device 20, a plural number of bleeder cords C are applied to be affixed to each lot of the treatment member T, and each of the bleeder cords C is cut, at its trailing end, for each lot of the treatment member T by a bleeder cord cutting devices 40S.

The bleeder cord C is made up of thin cotton threads which are somewhat apt to be broken. When a plurality of the bleeder cords C are applied and affixed, in parallel arrangement, to the surface of the treatment member T, the affixed bleeder cords C function to bleed and absorb air masses (gas masses) which are produced during the tire production process.

Figure 1:
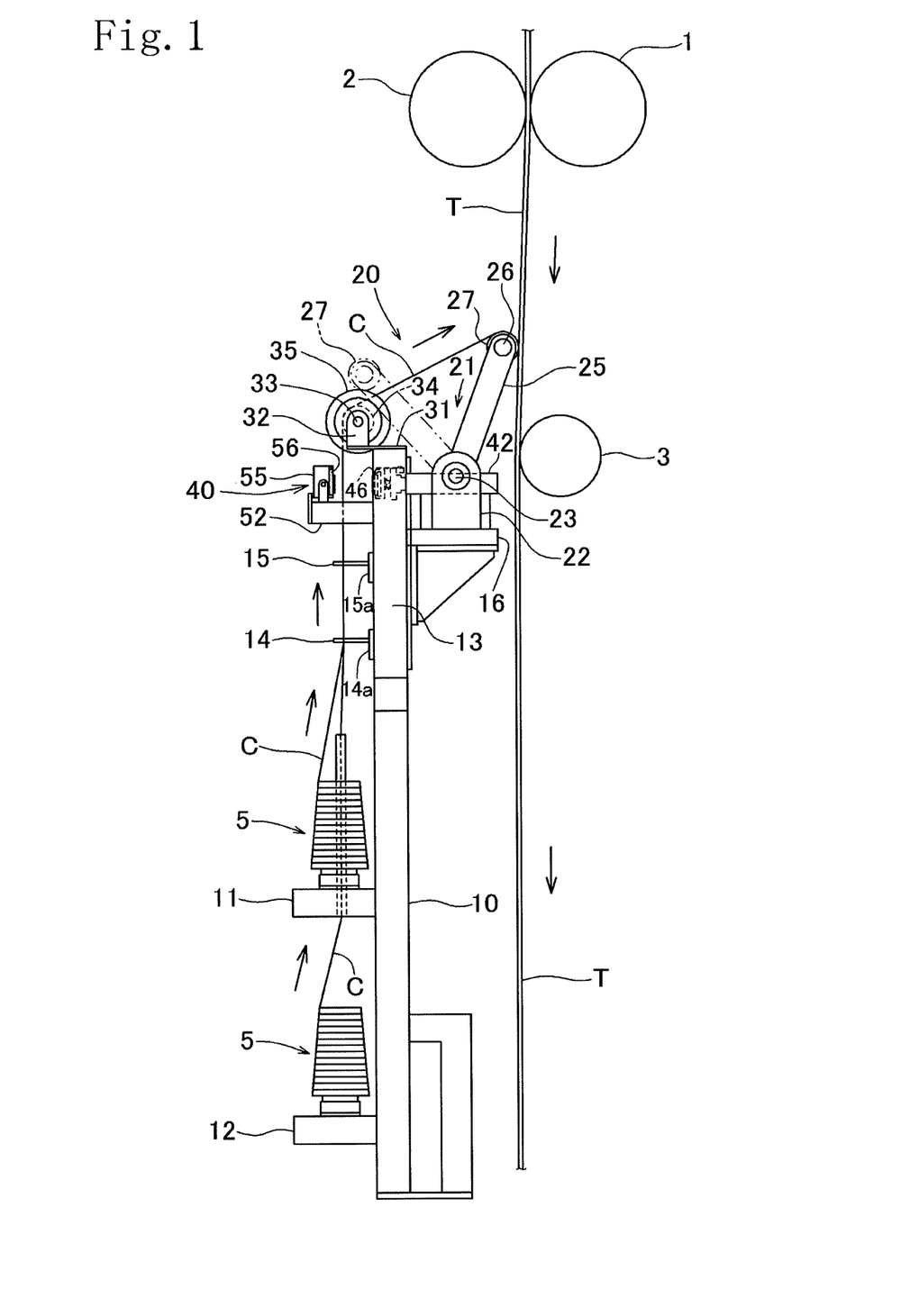
FIG. 1 is an entire side view of a bleeder cord affixing device according to an embodiment of the invention, with bleeder cord cutting devices incorporated therein.
Figure 2:
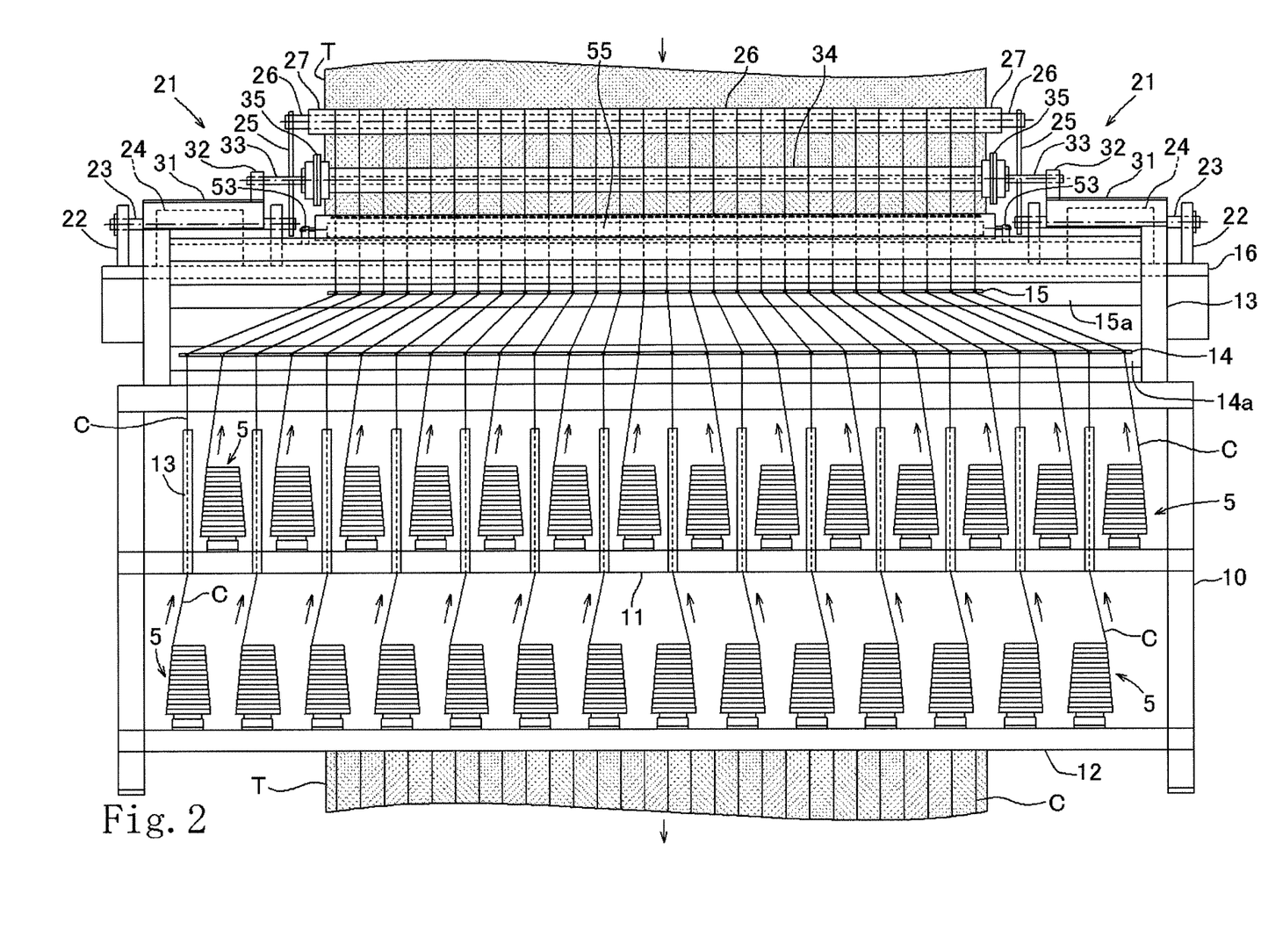
FIG. 2 is a front view of the same.
Figure 3:
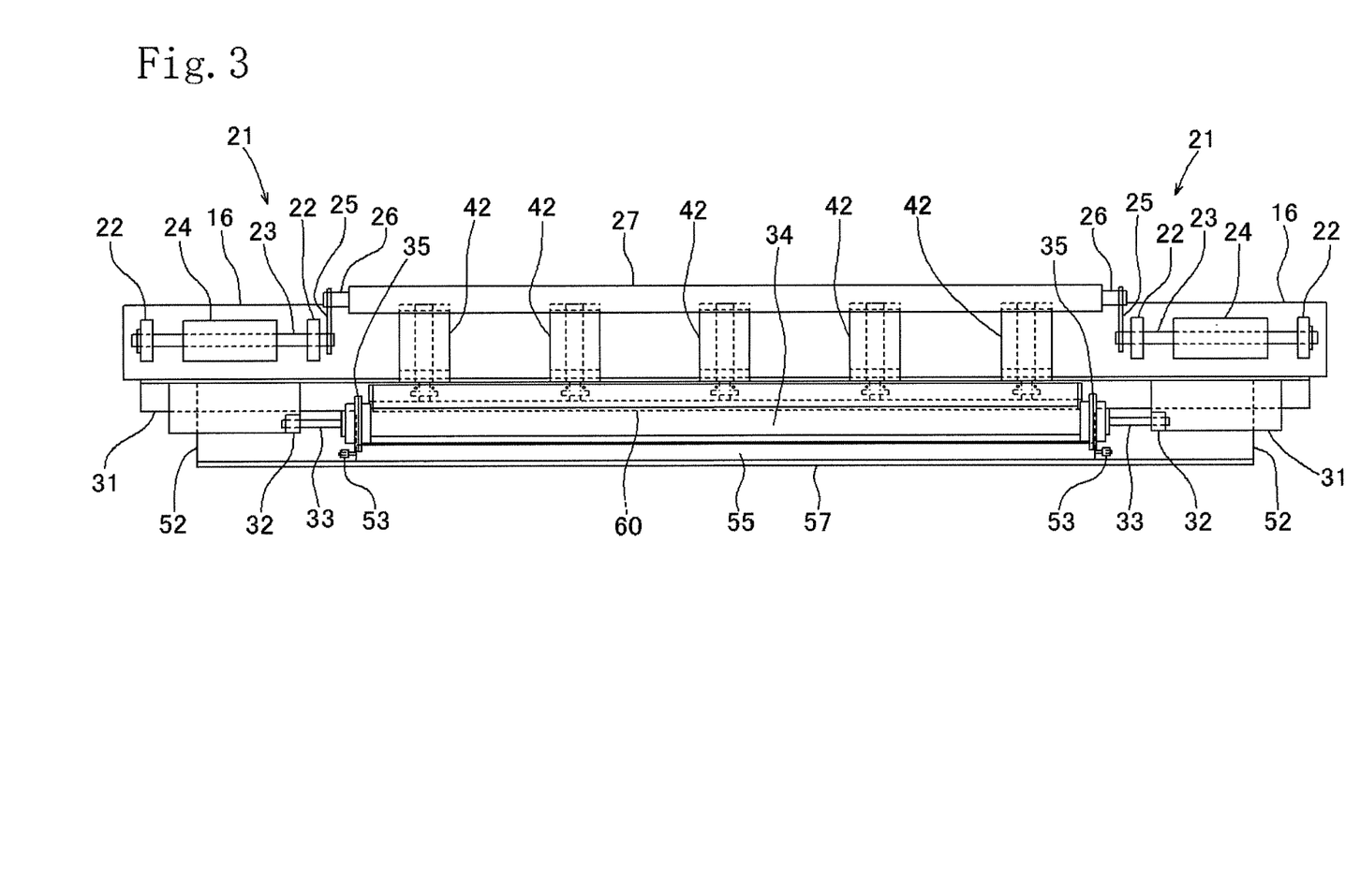
FIG. 3 is a plan view of the same.

FIG. 1 shows, in entire side view, the bleeder cord affixing device 20 and the bleeder cord cutting device 40, FIGS. 2 and 3 showing the same in front view and plan view, respectively.

The treatment member T fed in the treatment member feeding line is supplied continuously downward from above through a pair of gripping rollers 1 and 2 located at an upper position of the bleeder cord affixing device 20. The gripping rollers 1 and 2 constitute a treatment member feeding device.

A suppressing roller 3 is provided along the downward feeding pass of the treatment member T and on the opposite side of the bleeder cord affixing device 20.

The bleeder cord affixing device has a supporting rack 10 provided with upper and lower shelf plates 11 and 12, on which is supported a plurality of bobbins 5 around which the bleeder cords C are wrapped or coiled. The supporting rack 10 extends horizontally in the breadth direction in which the bobbins 5 are arranged.

Each of the bleeder cord C is released upward from each bobbin 5. The bleeder cords C released from the bobbins 5 on the lower shelf plate 12 are passed upward through tubes 12 erected between adjacent bobbins 5 on the upper shelf plate 11. The bleeder cords C released from the bobbins 5 on the lower shelf plate 12 are therefore passed upward between adjacent bleeder cords C released from the bobbins 5 on the upper shelf plate 11, whereby all the bleeder cords C from all the lower and upper bobbins 5 are arranged along each other in the breadth direction of the bleeder cord affixing device.

The horizontally elongated supporting rack 10 has on the opposite ends thereof support columns 13 erected upward. Between the lower portions of the support columns 13 extend a lower beam 14a with a vertical wall and an upper beam 15a with a vertical wall. The lower beam 14a has a lower bleeder cord arranging plate 14 horizontally attached to the vertical wall thereof, and the upper beam 15a has an upper bleeder cord arranging plate 15 horizontally attached to the vertical wall thereof. These lower and upper bleeder cord arranging plates 14 and 15 are located above the bobbins 5 on the upper and lower shelf plates 11 and 12.

The lower and upper bleeder cord arranging plates 14 and 15 are members elongated in the horizontal breadth direction, and a series of vertical holes are formed in line in each of the bleeder cord arranging plates 14 and 15. The bleeder cords C are passed through these vertical holes in the arranging plates 14 and 15 so that the bleeder cords C are arranged in rows with predetermined distances between adjoining bleeder cords. The bleeder cord arranging plates 14 and 15 constitute a bleeder cord arranging device.

The vertical holes of the upper arranging plate 15 have shorter distances therebetween than the vertical holes of the lower arranging plate 14, so that the distances between upwardly extending, adjoining bleeder cords C are narrowed as the bleeder cords C move upward, and the horizontal width of the entire upward extension of the bleeder cords C is narrowed as they extend upward.

The treatment member T are moved or fed downward continuously from above on the side opposite the bobbins 5 with respect to the support columns 13.

Hereinafter, the side of the treatment member T with respect to the support columns 13 will be referred to as "front side", the opposite side as "rear side", the left side for a person when he or she looks toward the front side as "left side", and the right side for a person when he or she looks toward the front side as "right side".

Thus, the lower and upper arranging plates 14 and 15 protrude to the rear side.

On the upper halves of the support columns 13 are supported the bleeder cord affixing device 20 and the bleeder cord cutting device 40.

Between the support columns 13 are securely supported a front-side horizontal beam plate 16 so as to protrude to the front side. The left and right ends of the front-side horizontal beam plate 16 have bearing members 22 erected upward, and a pair of horizontal pivot shafts 23 are supported by the bearing members 22, respectively, the pivot shafts 23 extending in the left-right direction. The pivot shafts 23 are driven in rotation by means of drive mechanisms 24, respectively, each including a driving motor and a power transmission device.

Swing arms 25 are fixedly secured at the proximal ends thereof to the left and right pivot shafts 23, respectively, to extend upward. A support shaft 26 are connected at the two ends thereof to the distal ends of the two swing arms 25, and an elongated affixing roller 27 is fitted on the support shaft 26 to extend from the left side to the right side.

The affixing roller 27 has an outer cylindrical surface on which are formed a plurality of axially extending regions with an extremely low surface roughness and with a high surface roughness greater than the low surface roughness, these regions with different roughnesses being arranged alternately in the circumferential direction of the affixing roller.

The affixing roller 27 is rotatable relative to the support shaft 26 only in one direction (in the clockwise direction as viewed in FIG. 1) by means of a one-way clutch (not shown).

When the pivot shafts 23 are driven in rotation by means of the drive mechanisms 24 on the left and right sides, the upwardly extending left and right swing arms 25 are swung, whereby the affixing roller 27 supported by the swing arms 25 are also swung to the front and rear sides.

An affixing roller swing mechanism 21 is thus formed.

On the tops of the left and right support columns 13 are supported horizontal support plates 31, respectively, which extend inwardly toward each other and protrude to the rear side. The left and right support columns 13 have thereon upstanding left and right shaft support members 32, respectively, and a horizontal support shaft 33 is supported by the left and right shaft support members 32. An elongated pass roll 34 is fitted on the horizontal support shaft 33 so as to extend in the left-right direction. On both sides of the pass roll 34, stopper rolls 35 of enlarged diameter are fitted.

The pass roll 34 is adapted to be rotatable in one direction (clockwise direction in FIG. 1) only relative to the support shaft 33 by means of a one-way clutch (not shown). The rotatable direction of the pass roll 34 is the same as that of the affixing roller 27.

The pass roll 34 extends parallel to, and is of a length substantially equal to the affixing roller 27, which is supported between the distal ends of the swing arms 25 and swingable to the front and rear sides. When the affixing roller 27 is swung to the rear side, the two axial end portions of the affixing roller 27 are caused to contact the stopper rolls 35 at the two sides of the pass roll 34, respectively, whereby the affixing roller 27 is prevented from rotary movements in two directions.

When the affixing roller 27 is swung to the front side, it is caused to contact the treatment member T which is being moved or fed downward from above by the gripping rollers 1 and 2, so as to enable the bleeder cords C to be applied and affixed to the treatment member T.

The affixing roller 27, the affixing roller swing mechanism 21, the pass roll 34, the stopper rolls 35 and so on constitute the bleeder cord affixing device 20.

Immediately below the pass roll 34 are located a plural number of the bleeder cord cutting devices 40

Figure 4:
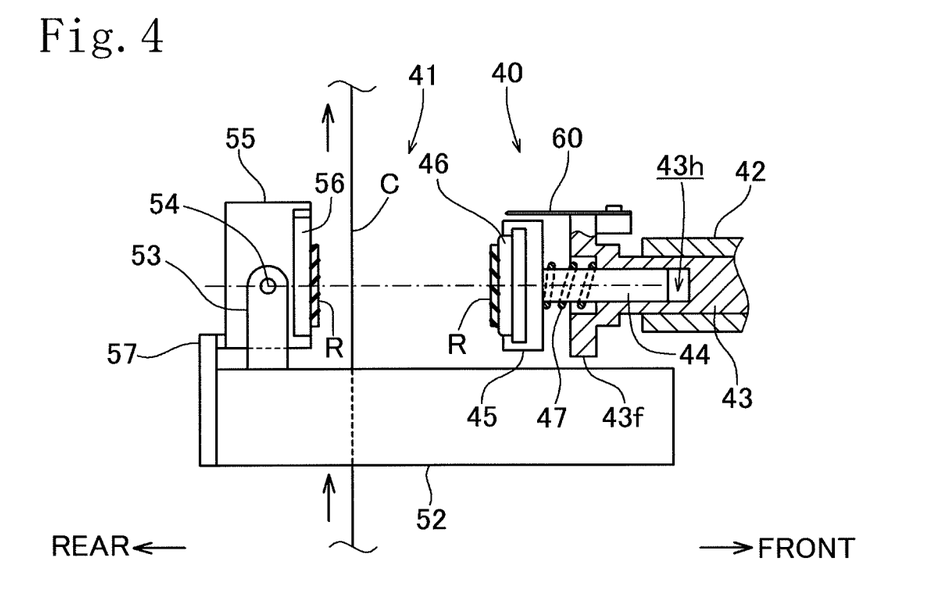
FIG. 4 is an enlarged side view, partly in section, of the bleeder cord cutting device.

As indicated in FIG. 4, each bleeder cord cutting device 40 includes a bleeder cord clamping mechanism 41 for clamping the bleeder cord C, and a cutter 60 made of a cutter plate elongated in the left-right direction.

On the front-side horizontal beam plate 16 are mounted five pneumatic cylinders 42 (FIG. 3) positioned in a spaced-apart arrangement in the left-right direction, and a piston rod 43 extends rearward from each of the cylinders 42.

As shown in FIG. 4, the free end of each piston rod 43 is formed with a flange portion 43f having an axial hole 43h that opens in the center of the face of the flange portion 43f.

A support rod 44 is slidably fitted in the axial hole 43h of the piston rod 43, and a clamping plate holder 45 is provided on the free end of the support rod 44. The clamping plate holder 45 holds therein a movable-side clamping plate 46, which is elongated in the left-right direction and has its clamping face directed rearward.

The axial hole 43h of the piston rod 43 has an opening portion enlarged in internal diameter, and a coil spring 47 wound around the support rod 44 is inserted in the enlarged opening portion of the axial hole 43h. The coil spring 47 is interposed between the bottom of the enlarged opening portion and the clamping plate holder 45.

The coil spring 47 is fitted to provide a space between the flange portion 43f and the clamping plate holder 45.

On the upper part of the flange portion 43f of the piston rod 43 is fixedly mounted a cutter 60, which is elongated in the left-right direction and is fixed at its proximal end to the flange portion 43f to protrude toward the rear side.

As shown in FIG. 4, the rearward extending cutter 60 protrudes to the rear side relative to and along the upper surface or lateral side of the movable-side clamping plate 46, when no clamping force is applied to the movable-side clamping plate 46, so that the coil spring 47 is not compressed. In this state, the tip blade (rear end in FIG. 4) of the cutter 60 is at a position slightly shifted or retracted to the front side relative to the clamping face of the movable-side clamping plate 46.

When the movable-side clamping plate 46 is forced to the front side, the clamping plate holder 45 is moved toward the flange portion 43f with the coil spring 47 being compressed. Consequently, the tip (rear) blade of the cutter 60 is caused to project to the rear side relative to the clamping face of the movable-side clamping plate 46.

At the height of the pass roll 34 and the upper bleeder cord arranging plate 15 and between the support columns 13 as viewed in FIG. 2, a rear-side horizontal beam plate 52 is fixedly provided so as to extend toward the rear in the direction opposite the piston rod 43, and bearing members 53 are fixedly provided on the left and right end parts of the horizontal beam plate 52. As shown in FIG. 4, a support shaft 54 rotatably supported by the bearing members 53 fixedly holds thereon a clamping plate holder 55 which is elongated in the left-right direction.

The clamping plate holder 55 holds thereon a stationary-side clamping plate 56 elongated in the left-right direction.

Figure 5:
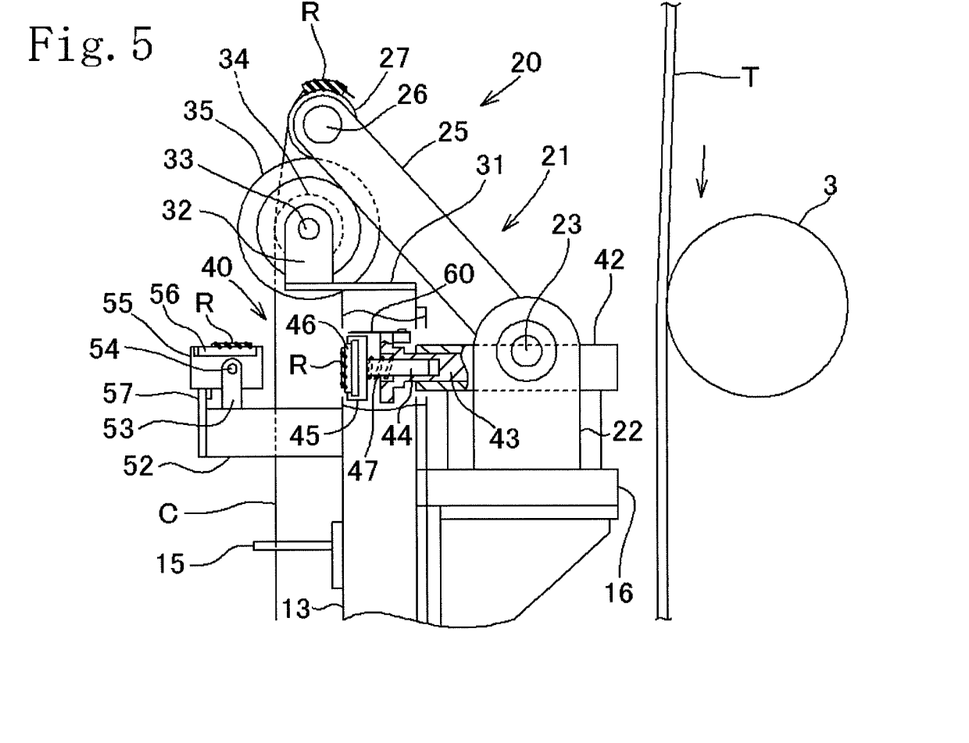
FIG. 5 is a side view, partly in section, of an essential part of the bleeder cord affixing device, showing a preparatory step of applying or attaching bleeder cords.

Along the rear end (left end as viewed in FIG. 4) of the rear-side horizontal beam plate 52 extends a stopper member 57, which is, as indicated in FIG. 4, positioned to abut with the rear surface of the clamping plate holder 55 in an attitude in which the clamping face of the clamping plate 56 facing toward the front side. As shown in FIG. 5, the stopper member 57 is designed to be able to be in abutment with and support thereon the rear surface of the clamping plate holder 55 in an attitude thereof with the clamping face of the stationary-side clamping plate 56 facing upward.

The bleeder cord clamping mechanism 41 operates to move the stationary-side clamping plate holder 55 between a closed attitude in which the clamping face of the stationary-side clamping plate 56 thereon faces toward the front side in confrontation with the movable-side clamping plate 46 and an open attitude in which the clamping plate holder 55 is turned by 90° so that the clamping face of the stationary-side clamping plate 56 is directed upward.

The bleeder cords C are applied and affixed to each lot of the treatment member T, which is continuously fed downward by means of the gripping rollers 1 and 2 along the treatment member feeding line or path, by the operation of the bleeder cord affixing device 20, and the bleeder cords C are then cut by means of the bleeder cord cutting devices 40.

A process of applying or affixing the bleeder cords C by the bleeder cord affixing device 20 and a process of cutting the bleeder cords C by the bleeder cord cutting devices 40 will be described with reference to FIG. 5 to FIG. 11.

Referring to FIG. 5 showing a preparatory step of bleeder cord application, the bleeder cord affixing device 20 is in a standby position in which the swing arms 25 is swung to the rear side by means of the affixing roller swing mechanism 21 with the result that the affixing roller 27 is moved away from the treatment member T. In this standby position, the affixing roller 27 is in abutment with the stopper rolls 35 fixed to the pass roll 34, so that the affixing roller 27 is prevented from rotation in two directions.

In this state, each bleeder cord cutting device 40 is in a state in which the piston rod 43 of the cylinder 42 is retracted into the cylinder so that the movable-side clamping plate 46 is moved away from the stationary-side clamping plate 56 and in a state in which the stationary-side clamping plate 56 has the clamping face thereof facing upward.

A tip rubber tape or piece of strip R of adhesive nature is commonly attached to the leading ends of the bleeder cords C, which leading ends are above the upper bleeder cord arranging plate 15. The operator attaches this tip rubber tape or piece R onto the upper outer surface of the affixing roller 27 in this standby position.

As mentioned herein above, the outer surface of the affixing roller 27 has the circumferentially alternately arranged regions with an extremely low surface roughness and with a high surface roughness. Thus, the tip rubber tape or piece R attached to the regions of an extremely low surface roughness of the outer surface of the affixing roller 27 is prevented from slipping off the affixing roller 27 and securely fixed thereto.

The affixing roller 27 is in abutment with the stopper rolls 35 fixed to the pass roll 34 which is rotatable in one direction only. Therefore, the affixing roller 27 is prevented from rotating in two directions, so that the affixing roller 27 does neither rotate inadvertently to change the attached position of the tip rubber tape R on the outer surface of the affixing roller 27, nor the tip rubber tape R is peeled off the outer surface of the affixing roller 27.

The tip rubber tape R attached to the affixing roller 27 may be a long tape of a length equivalent to the extent of the upper bleeder cord arranging plate 15 in which the bleeder cords C are passed. However, such long tip rubber tape R is not easy to handle. To overcome this disadvantage, a plurality of shortened-length tip rubber tapes R may be used in unison.

Then, as shown in FIG. 5, the operator moves the movable-side clamping plate 46 away from the stationary-side clamping plate 56, and attaches the tip rubber tapes R onto the face of the upwardly facing stationary-side clamping plate 56 in the open attitude and onto the face of the movable-side clamping plate 46.

Figure 6:
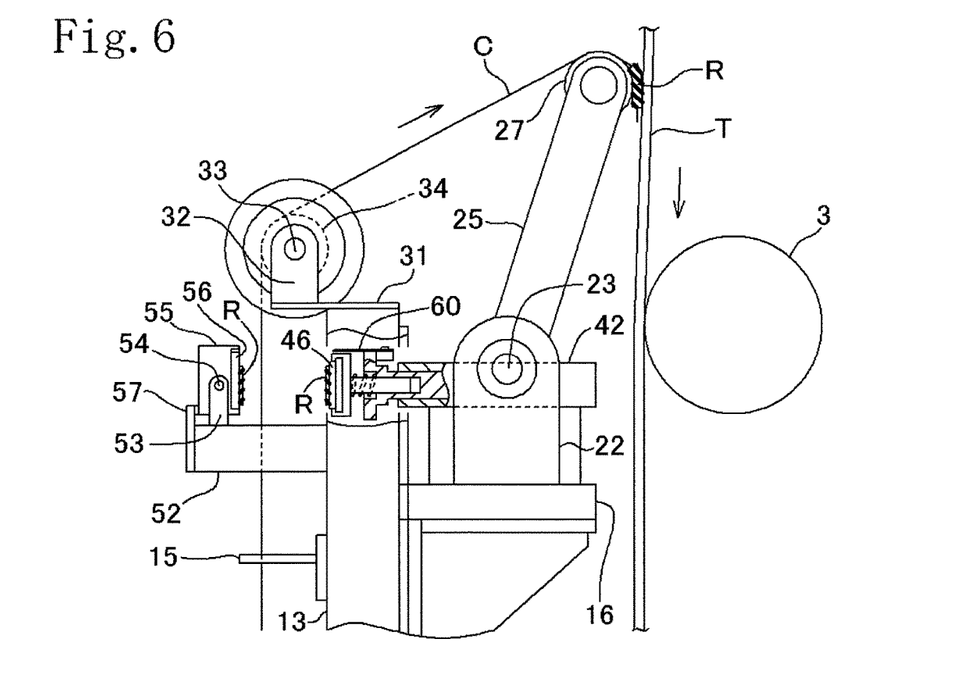
FIG. 6 is a side view, partly in section, of the essential part of the bleeder cord affixing device, showing a step of starting the affixing operation of the bleeder cords.

After the tip rubber tape R is applied to the stationary-side clamping plate 56, the stationary-side clamping plate 56 is rotated 90° around the support shaft 54, as shown in FIG. 6, to cause the face thereof to be directed to the face of the movable-side clamping plate 46 on which the tip rubber tapes R has been applied.

Then the treatment member T is fed, by the gripping rollers 1 and 2, continuously downward by a distance corresponding to a lot or a predetermined amount. At a proper timing when the leading or lower end of the treatment member T reaches a predetermined position, the affixing roller swing mechanism 21 in the standby position is operated to swing to the front side so as to cause the affixing roller 27 to approach, contact and be pressed on the treatment member T which is being continuously fed downward (see FIG. 6).

During the swinging movement of the affixing roller 27 to the front side, rotation of the affixing roller 27, which is being pulled by the bleeder cords C extending to the rear side from the tip rubber tapes R attached to the upper circumferential surface of the affixing roller 27, is prevented because the affixing roller 27 is not permitted to rotate in that direction. Therefore, during the swinging movement of the affixing roller 27 from the standby position to the position pressed on the treatment member T, the tip rubber tape R attached to the upper circumferential surface of the affixing roller 27 in the standby position thereof is automatically moved from the upper surface position of the affixing roller 27 to a lateral surface position of the affixing roller 27, whereby the tip rubber tape R is pressed against the treatment member T, which is being fed downward, and adhered or affixed to the treatment member T by being pressed with the affixing roller 27 against the treatment member T.

The affixing roller 27 is caused to rotate, at this position pressed against the treatment member T, by the downward feeding movement of the treatment member T.

At an initial stage of the affixing roller 27 being pressed against the treatment member T, the tip rubber tape R attached to the upper circumferential surface of the affixing roller 27 is pressed by the treatment member T to be affixed to the treatment member T, which has a stronger adhesive strength than the affixing roller 27, so that the tip rubber tape R is transferred to the treatment member T.

Since the affixing roller 27 has a plurality of circumferentially alternately arranged regions with a high surface roughness, the tip rubber tape R can be easily peeled off the affixing roller 27 being rotated.

As the tip rubber tape R is thus transferred to the treatment member T being continuously fed, the tip rubber tape R is adhered to the treatment member T and moved integrally therewith, whereby the plurality of the bleeder cords C extending from the tip rubber tape R are pulled by the tip rubber tape R in a state guided by the upper bleeder cord arranging plate 15. The bleeder cords C being pulled are guided by the pass roll 34 and then pressed onto the treatment member T by the affixing roller 27, so that the bleeder cords C are affixed to the surface of the treatment member T being continuously fed in a predetermined arrangement (see FIG. 7).

Figure 7:
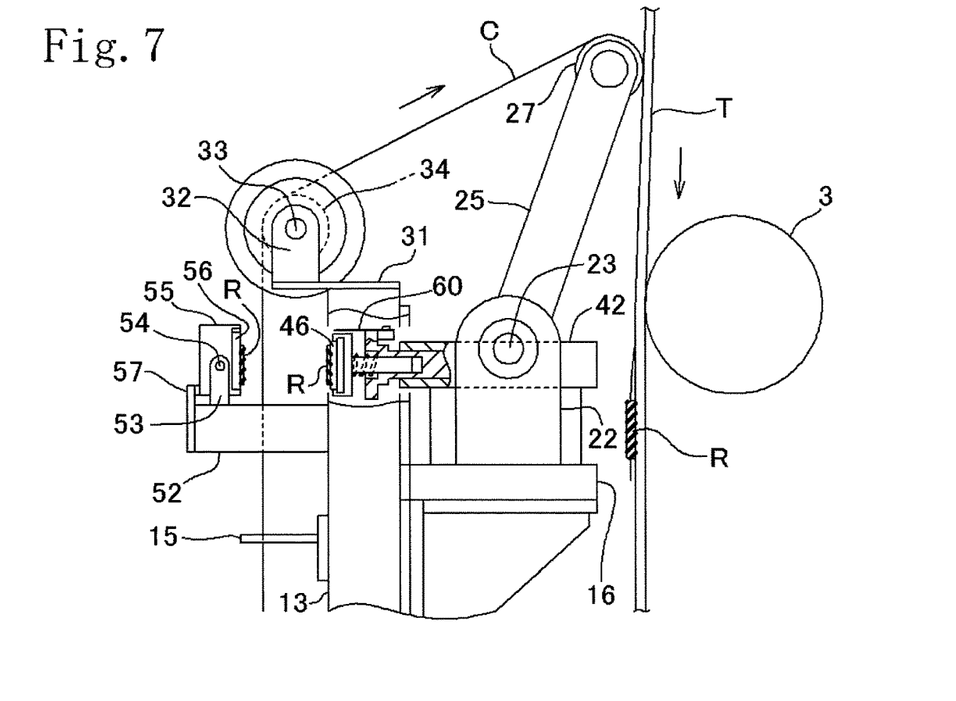
FIG. 7 is a side view, partly in section, of the essential part of the bleeder cord affixing device, showing an operational step immediately after the start of the affixing operation of the bleeder cords.

As described above, the bleeder cord affixing device 20 can operate, with the use of the affixing roller swing mechanism 21 of simplified construction, to reliably affix the bleeder cords C, by the swingable affixing roller 27, to the surface of the treatment member T being fed continuously without stopping the operation of the treatment member feeding line, with resultant improved productively.

When the bleeder cords C are affixed as above to the one-lot length treatment member T being fed and the terminal end (starting end of a liner member) of the treatment member T approaches, the cylinders 42 of the bleeder cord clamping mechanism 41 forming bleeder cord cutting devices 40 are operated to project the piston rods 43, as drive members, and to presses the movable-side clamping plates 46 to the rear side via the coil springs 47 against the stationary-side clamping plates 56.

Figure 8:
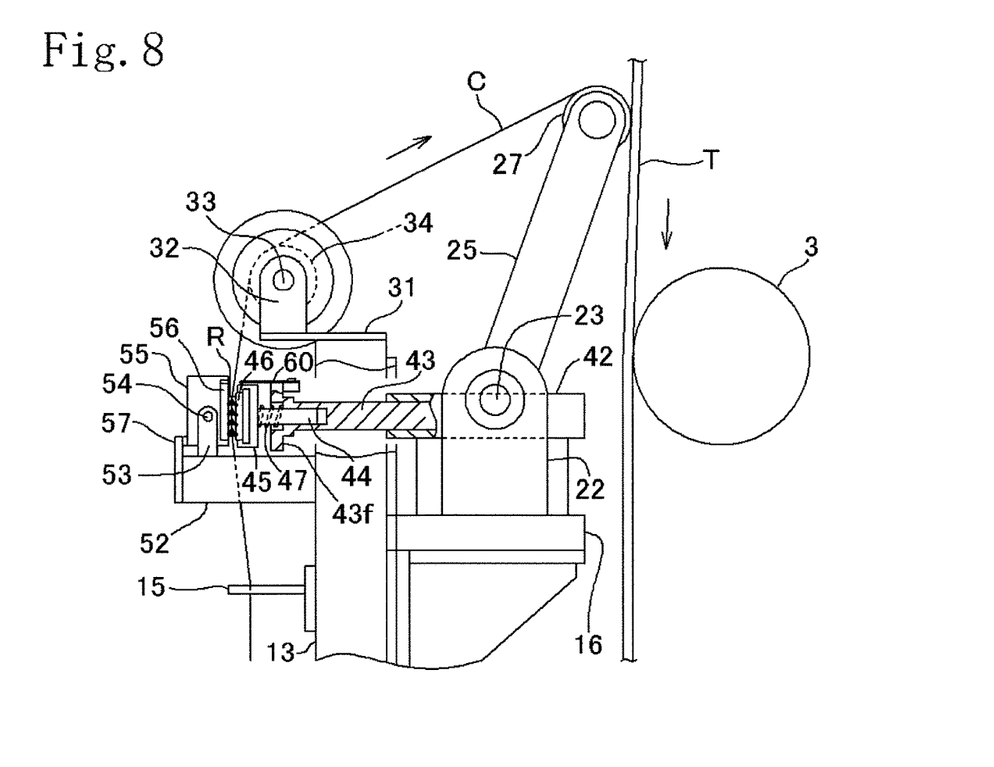
FIG. 8 is a side view, partially in section, of the essential part of the bleeder cord affixing device, showing an end step of the affixing operation of the bleeder cords.

Consequently, as shown in FIG. 8, a tip rubber tape or piece R on the stationary-side clamping plate 56 and a tip rubber tape or piece R on the movable-side clamping plate 46 grip therebetween the bleeder cords C that have passed the upper bleeder cord arranging plate 15 and the pass roll 34 and that have been arranged between the upper bleeder cord arranging plate 15 and the pass roll 34.

The bleeder cords C thus clamped between the tip rubber tapes or pieces R on the movable-side and stationary-side clamping plates 46 and 56 still continue to be pulled upward.

Figure 9:
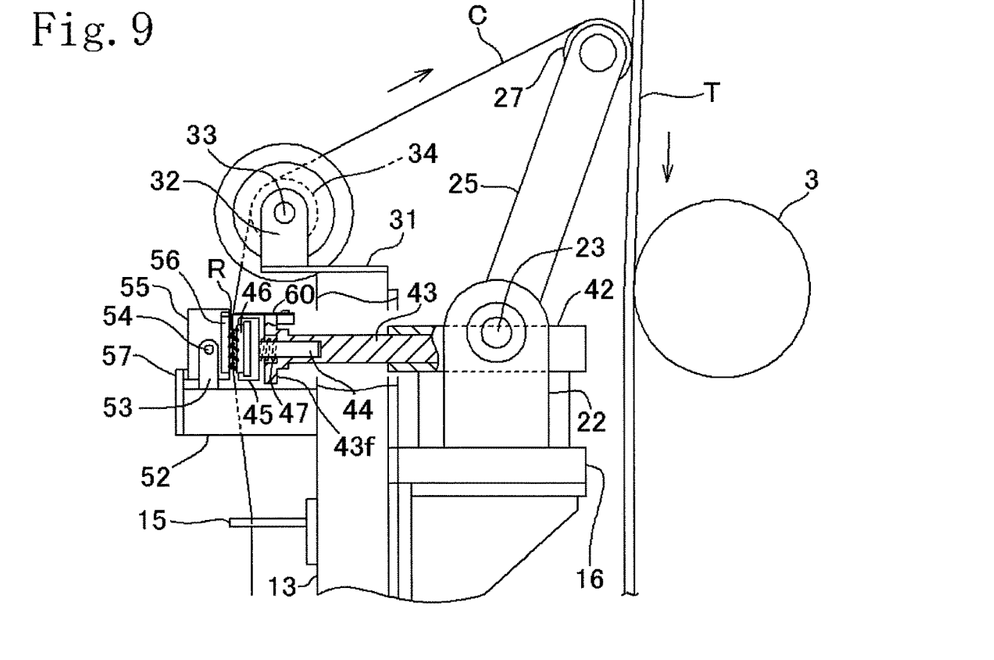
FIG. 9 is a side view, partially in section, of the essential part of the bleeder cord affixing device, showing a step of cutting the bleeder cords.
Figure 10:
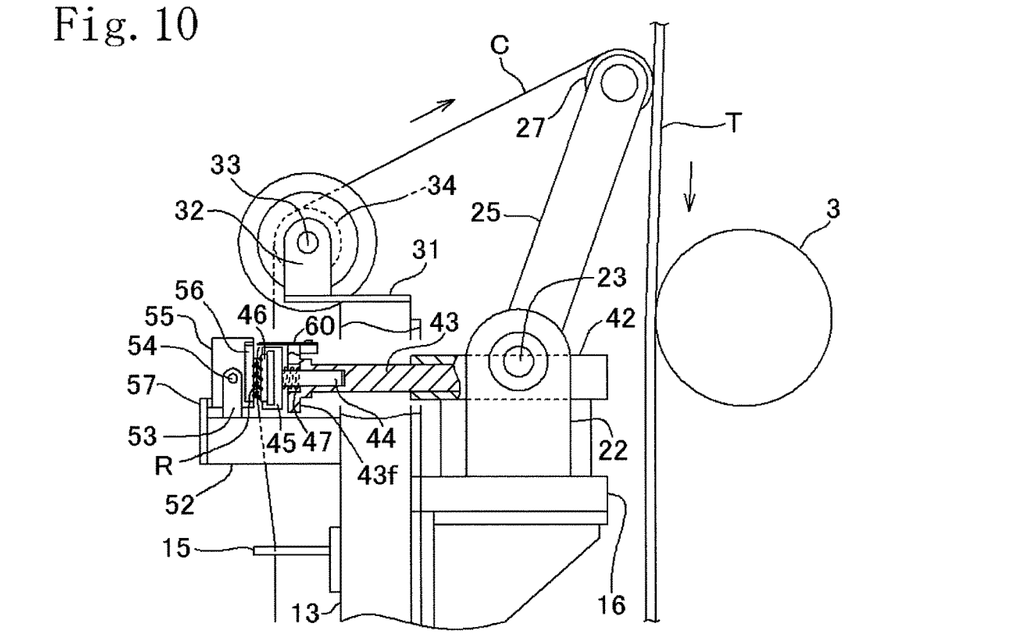
FIG. 10 is a side view, partly in section, of the essential part of the bleeder cord affixing device, showing a step immediately after the cutting of the bleeder cords.

When the piston rods 43 are projected further, as indicated in FIG. 9, the coil springs 47 are compressed further to such an degree that the movable-side clamping plate 46 are further pressed against the stationary-side clamping plate 56 to strongly clamp the bleeder cords C therebetween, so that the bleeder cords C pulled away from the clamping faces of the clamping plates 46 and 56 are subjected to tension. Immediately after the tension is applied, the flange portions 43*f* of the piston rods 43 that have compressed the coil springs 47 approaches the clamping plate holders 45, and the cutters 60 fixedly mounted to the flange portions 43*f* are caused to project beyond the clamping plate holders 4 and beyond the rear-side face of the movable-side clamping plates 46 to extend beyond the opposite clamping faces of the clamping plates.

This means that the cutters 60 are projected across the bleeder cords C being pulled upward under tension from the clamping faces, so that the cutters 60 operate to cut the bleeder cords C from their succeeding portions.

The lengths of the bleeder cords C that have cut off from the succeeding portions of the bleeder cords C are fed by the affixing roller 27 and affixed to the surface of the treatment member T to the trailing ends thereof. The leading ends of the succeeding portions of the bleeder cords C are clamped between the tip rubber tapes or pieces R on the clamping faces of the movable-side and stationary-side clamping plates 46 and 56. Consequently, the tip rubber tapes or pieces R are attached to the leading ends of the succeeding portions of the bleeder cords C (see FIG. 10).

The bleeder cords C are thus affixed to the treatment member T of one lot.

After the bleeder cords C have been applied and affixed to the treatment member T of one lot, the feeding operation of the treatment member T continues and the succeeding lot of the treatment member T is supplied to the bleeder cord affixing device 20.

Figure 11:
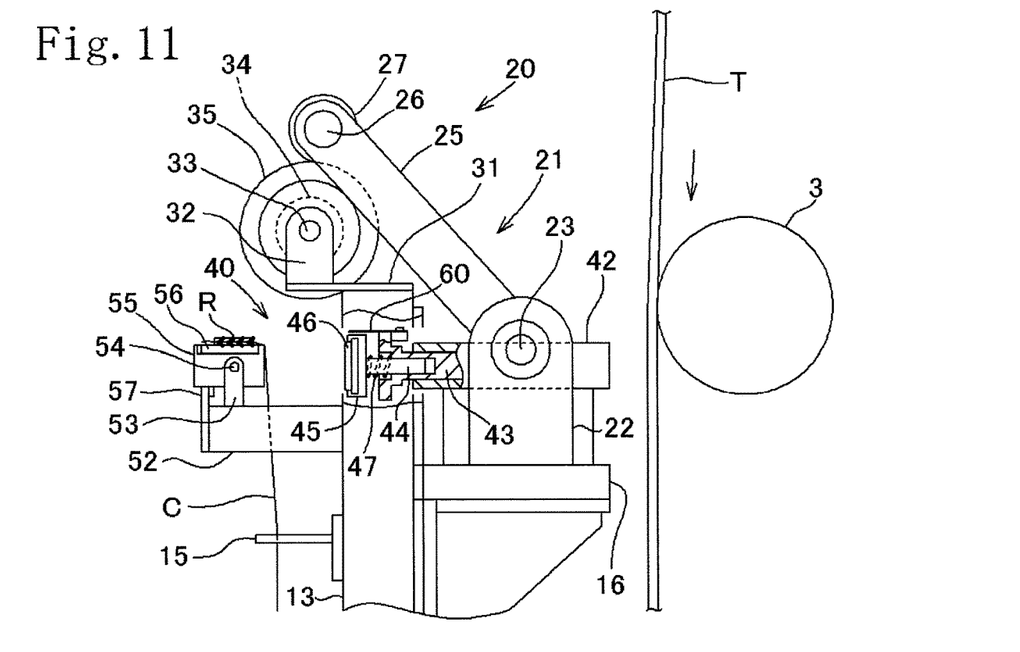
FIG. 11 is a side view, partly in section, of the essential part of the bleeder cord affixing device, showing a step before the preparatory step of affixing the bleeder cords.

For the next lot of the treatment member, the affixing roller swing mechanism 21 operates, as shown in FIG. 11, to cause the swing arms 25 to swing to the rear side to thereby move the affixing roller 27 from the pressed position to the standby position, that is, the position in which the affixing roller 27 is abutment with the stopper rolls 35 on the both side of the pass roll 34.

On the other hand, the cylinders 43 are operated to retract the piston rods 43 inward so as to move the movable-side clamping plates 46 away from the stationary-side clamping plates 56.

By making the surface roughness of the movable-side clamping plates 46 somewhat greater than that of the stationary-side clamping plates 56, the tip rubber tape or piece R attached to the movable-side clamping plates 46 is more apt to be peeled off the clamping plate faces than the tip rubber tape or piece R attached to the stationary-side clamping plates 56, so that the tip rubber tape or piece R attached to the stationary-side clamping plates 56 of higher adhering strength remains on the clamping plate faces. Consequently, when the clamping plate holders 55 are swung by 90° to the open position to cause the clamping faces of the stationary-side clamping plates 56 to be directed upward, as shown in FIG. 11, the upwardly facing tip rubber tape or piece R on the stationary-side clamping plates 56 can be easily peeled off the clamping plates 56 by the operator.

Before the next lot of the treatment member T is supplied into the bleeder cord affixing device 20, the operator peels or removes the tip rubber tape or piece R adhered to the movable-side clamping plate 46 off the same and attaches the removed tip rubber tape or piece R to the affixing roller 27, which is in the standby position and is prevented from rotation in the two directions (see FIG. 5).

Thereafter, the operator attaches new tip rubber tape R onto the upwardly directed clamping faces of the stationary-side clamping plates 56 in the open position and onto the clamping faces of the movable-side clamping plates 46, as indicated in FIG. 5.

Thereafter, the steps shown in FIGS. 6 through 11 are repeated to apply and affix the bleeder cords C to the continually succeeding lots of the treatment member T.

As described above, the bleeder cord affixing device 20 carries out the steps below. The affixing roller 27, placed in the standby position away from the treatment member T by means of the affixing roller swing mechanism 21, is moved to the pressed position on the treatment member T being fed continuously, with the tip rubber tape R commonly attached to the leading ends of the bleeder cords C arranged in rows by means of the upper bleeder cord arranging plate 15. The affixing roller 27 is then rotated due to the feeding movement of the treatment member T and functions to press and affix the tip rubber tape R to the surface of the treatment member T. The affixing roller 27 thereafter functions to press and affix the bleeder cords C to the treatment member T. As a result of these steps, the bleeder cords C can be affixed reliably to the surface of the continuously advancing treatment member T without stopping the operation of the treatment member feeding line, whereby productivity is improved.

The affixing roller 27 is rotated in one rotatable direction due to the contact friction with the treatment member T continuously being fed. It is therefore prevented that the affixing roller 27 rotates in the reverse direction by being pulled with the bleeder cords C, when the affixing roller 27 approaches and is pressed on the treatment member T with the leading ends of the bleeder cords C attached to the outer surface of the affixing roller 27 with the common tip rubber tape R. As a result, the tip rubber tape R can be reliably attached to the treatment member T by the pressing function of the affixing roller 27, with the tip rubber tape R being attached at a predetermined position on the outer surface of the affixing roller 27.

Rotation of the affixing roller 27 is prevented by the stopper rolls 35 when the affixing roller 27 is in the standby position away from the continuously advancing treatment member T. For this reason, the tip rubber tape R commonly attached to the leading ends of the bleeder cords C can be securely maintained at the predetermined attached position on the surface of the affixing roller 27 in the standby position, and the affixing roller 27 in the standby position is prevented from unintended rotation, so that the tip rubber tape R can be reliably attached to the treatment member T.

The outer surface of the affixing roller 27 has the circumferentially alternately arranged regions with an extremely low surface roughness and with a high surface roughness. When the tip rubber tape R commonly attached to the leading ends of the bleeder cords C is adhered to the outer surface of the affixing roller 27, the regions with the extremely low surface roughness firmly secure the tip rubber tape R in position without displacement. When the affixing roller 27 rotated with the feeding movement of the treatment member T presses and adheres the tip rubber tape R to the treatment member T, the regions with the high surface roughness of the affixing roller 27 serve to easily peel the tip rubber tape R from the surface of the affixing roller 27, to thus smoothly carry out the attachment of the tip rubber tape R to the treatment member T.

The affixing roller swing mechanism 21 has the swing arms 25 extending upward from their proximal pivoted ends and bearing the affixing roller 27 on the distal ends. The affixing roller swing mechanism 21 operates to move the swing arms 25 from the rear side to the front side between the rear standby position away from the treatment member T and the front pressed position in which the affixing roller 27 is pressed onto the treatment member T being continuously moved downward. The tip rubber tape R can thus be attached to the upper circumferential surface of the affixing roller 27 in the rear standby position; and the tip rubber tape R, attached to the upper surface of the affixing roller 27 in the rear standby position, is moved to the lateral position on the side surface of the affixing roller 27 when the affixing roller 27 changes its position to the front pressed position, whereby the tip rubber tape R is pressed on and confronts the downwardly moving treatment member T to be adhered to the treatment member T.

For this reason, the operation of attaching the tip rubber tape R on the outer surface of the affixing roller 27 is easy, and the operation of adhering the tip rubber tape R onto the treatment member T can be carried out easily and reliably.

In the above-described embodiment of the invention, the bleeder cord affixing device 20 operates to move the affixing roller 27 between the standby position and the pressed position by the swinging movement thereof by means of the affixing roller swing mechanism 21, but the swinging movement may be a linear movement between the standby position and the pressed position.

In the above-described embodiment, the treatment member T is supplied to continuously move downward from above, but the treatment member T may be supplied to the bleeder cord affixing device, to continuously move upward from below as in another embodiment of the invention which will be described with reference to FIGS. 12 and 13.

The bleeder cord affixing device according to the other embodiment is generally indicated by 80 and has a horizontal pivot shaft 82 extending in the left-right direction and rotatably supported by bearing members 81. A drive-side swing arms 83 are at one ends thereof fixedly connected to the pivot shaft 82 and at the other end thereof pivotally connected to a piston rod 84r of a pneumatic cylinder 84, so that the swing arms 83 can be swung about the pivot shaft 82 by the operation of the cylinder 84.

Driven-side swing arms 85 are at one ends thereof fixedly connected to the pivot shaft 82, and the other ends thereof are mutually connected by a support shaft 86 on which an elongated affixing roller 87 is supported rotatably.

Figure 12:
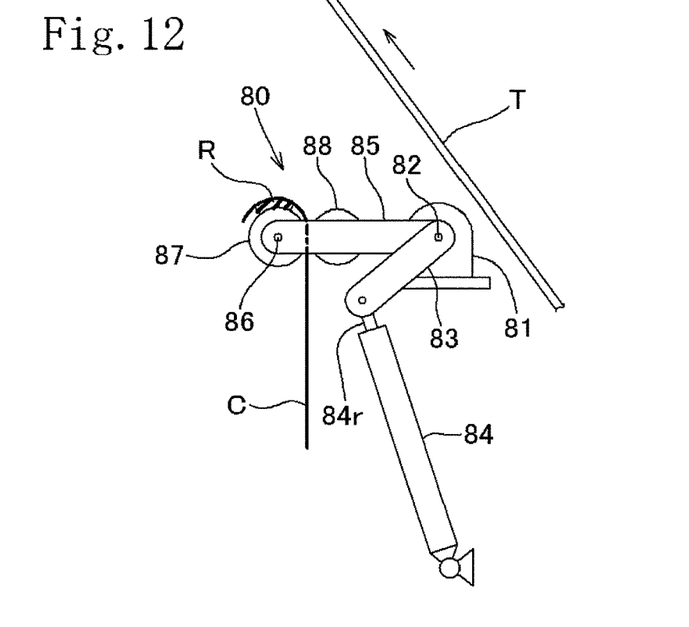
FIG. 12 is a side view of an essential part of the bleeder cord affixing device according to a modified embodiment of the invention.

The affixing roller 87 is rotatable in one direction only (in the anti-clockwise direction as viewed in FIG. 12).

The affixing roller 87 has an outer cylindrical surface on which are formed a plurality of axially extending regions with an extremely low surface roughness and with a high surface roughness, these regions with different roughnesses being arranged alternately in the circumferential direction of the affixing roller.

FIG. 12 shows a state in which the affixing roller 87 is in a standby position, in which a pass roll 88 is located between the driven-side swing arms 85 and in adjoining parallel position with the affixing roller 87.

The treatment member T is fed in an inclined feeding pass from below (the side of the bearing member) to above (the side of the pass roll) in an area above the bleeder cord affixing device 80.

As shown in FIG. 12, a tip rubber tape R is attached to the upper circumferential surface of the affixing roller 87 in the standby position, and bleeder cords C extending downward from the tip rubber tape R are passed between the pass roll 88 and the affixing roller 87.

When the cylinder 84 is operated to protrude the piston rod 84r outwardly, the drive-side swing arms 83 are swung, the pivot shaft 82 is rotated and the driven-side swing arms 85 are swung about the axis of the pivot shaft 82, so that the affixing roller 87 is moved toward the treatment member T which extends obliquely above the bleeder cord affixing device. As the affixing roller 87 is pressed against the treatment member T, the tip rubber tape R is pressed against and adhered to the treatment member T.

Figure 13:
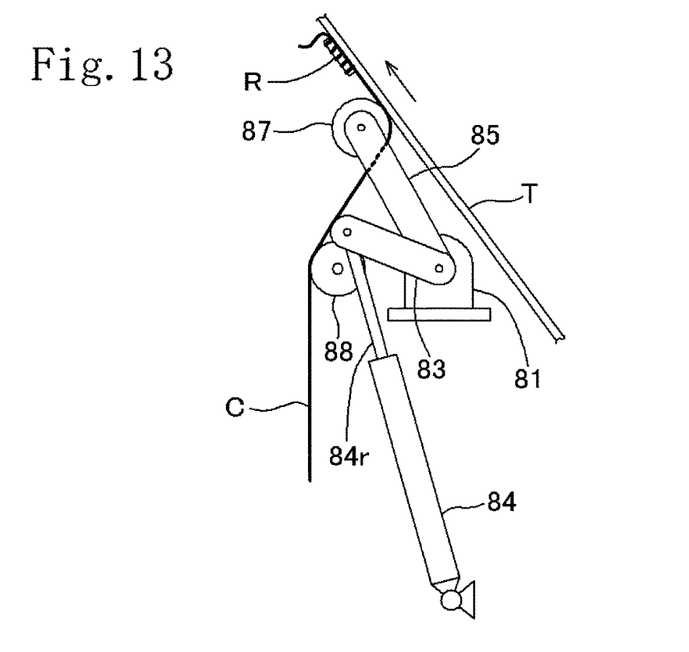
FIG. 13 is a side view of the essential part of the bleeder cord affixing device according to the modified embodiment of the invention, showing a step immediately after the bleeder cord have been affixed.

When the tip rubber tape R is transferred to the continuously moving treatment member T, the tip rubber tape R is also moved with the treatment member T, and the bleeder cords C extending from the tip rubber tape R are pulled upward in rows, so that the bleeder cords C are passed around the outer surface of the pass roll 88 and then pressed and affixed to the treatment member T in rows by the affixing roller 87 (see FIG. 13).

The bleeder cord affixing device 80, using the roll swing mechanism of simple construction, can thus operate to reliably affix the bleeder cords C to the treatment member T by means of the affixing roller 87 making swinging movement, without stopping the continuously and upwardly moving treatment member T, whereby productivity is improved.

The bleeder cord cutting device 40 operates to cut portions of the bleeder cords C clamped between the movable-side and stationary-side clamping plates 46 and 56, in such a manner that, after the clamping plates 46 and 56 of the bleeder cord clamping mechanism 41 clamp the bleeder cords C therebetween, the movable-side clamping plates 46 are further pushed by the piston rods 43, with the coil springs 47 compressed, to cause the cutters 60 to project to cut the bleeder cords C. The treatment member feeding line thus need not be stopped. In other words, the pair of the clamping plates 46 and 56 of the bleeder cord clamping mechanism 41 operate, while the treatment member T is being fed, to clamp therebetween the bleeder cords C, which are being pulled to be affixed to the treatment member T being fed. Further, when the bleeder cords C are clamped with the coil springs 47 compressed during the continuous feeding movement of the treatment member T, the bleeder cords C being pulled are subjected to tension and the cutters 60 are projected to cut the bleeder cords C immediately after the bleeder cords C are placed under the tension, so that the bleeder cords C can be cut easily and very reliably at their portions that have just passed the clamping faces of the clamping plates 46 and 56.

The cutters 60, which are fixedly mounted to the flange portions 43f of the piston rods 43, operate to cut the bleeder cords C by projecting along the sides of the movable-side clamping plates 46 beyond the clamping faces of the same toward the stationary-side clamping plates 56. For this reason, the bleeder cord clamping mechanism 41 is simplified in construction because of the driving operation of only the movable-side clamping plates 46, and a high safety is ensured because the cutters 60 are projected along the sides of the movable-side clamping plates 46 only when the cutters 60 cut the bleeder cords C.

The tip rubber tape R commonly attached to the leading ends of the bleeder cords C is previously attached to the clamping faces of the claiming plates 46 and 56, then the previously attached tip rubber tape R is used to grip the trailing ends of the preceding rows of the bleeder cords C to enable the cutting, by the cutters 60, of the preceding rows of the bleeder cords C from the following or succeeding rows of the bleeder cords C. This enables attachment of the tip rubber tape R onto the tip end portions of the succeeding rows of the bleeder cords C. Thus, when the initial rows of the bleeder cords C are to be treated to attach them initially on the affixing roller 27 with the tip rubber tape R in preparation for the attachment operation of the initial rows of the bleeder cords C on the treatment member T, additional tip rubber tapes R are attached also to both the clamping faces of the pair of the clamping plates 46 and 56. By doing so, attachment to the leading ends of the succeeding rows of the bleeder cords C can be performed efficiently.

The stationary-side clamping plates 56 are supported by the support shafts 54 extending in the left-right direction so as to be rotatable from the closed position facing the movable-side clamping plates 46 to the open position facing upward. Therefore, the tip rubber tape R can be readily attached to the upwardly directed faces of the stationary-side clamping plates 56 in the open position, whereby the operation of attaching the tip rubber tapes R on the clamping faces of the clamping plates 46 and 56 can be made efficiently.

REFERENCE CHARACTERS

T . . . Treatment member, C . . . Bleeder cord,
1, 2 . . . Gripping roller, 3 . . . Suppressing roller, 5 . . . Bobbin,
10 . . . Supporting rack, 11, 12 . . . Shelf plates, 13 . . . Support columns, 14 . . . Lower bleeder cord arranging plate, 15 . . . Upper bleeder cord arranging plate, 16 . . . Front-side horizontal beam plate,
20 . . . Bleeder cord affixing device, 21 . . . Affixing roller swing mechanism, 22 . . . Bearing member, 23 . . . Pivot shaft, 24 . . . Drive mechanism, 25 . . . Swing arm, 26 . . . Support shaft, 27 . . . Affixing roller, 31 . . . Horizontal support plate, 32 . . . Shaft support member, 33 . . . Support shaft, 34 . . . Pass roll, 35 . . . Stopper roll,
40 . . . Bleeder cord cutting device, 41 . . . Bleeder cord clamping mechanism, 42 . . . Cylinder, 43 . . . Piston rod, 43f . . . Flange portion, 44 . . . Support rod, 45 . . . Clamping plate holder, 46 . . . Movable-side clamping plate, 47 . . . Coil spring, 52 . . . Horizontal beam plate, 53 . . . Bearing members, 54 . . . Support shaft, 55 . . . Clamping plate holder, 56 . . . Stationary-side clamping plate, 57 . . . Stopper member, 60 . . . Cutter, 80 . . . Bleeder cord affixing device, 81 . . . Bearing member, 82 . . . Pivot shaft, 83 . . . Drive-side swing arm, 84 . . . Cylinder, 85 . . . Driven-side swing arm, 86 . . . Support shaft, 87 . . . Affixing roller, 88 . . . Pass roll.

The invention claimed is:

1. A bleeder cord affixing device comprising:
a treatment member feeding device for feeding a treatment member in a direction;
an affixing roller disposed to extend in a breadth direction across the direction in which the treatment member is fed;
a bleeder cord arranging device for guiding and arranging a plurality of bleeder cords with leading ends thereof in parallel rows along the direction in which the treatment member is fed; and
an affixing roller moving mechanism rotatably supporting the affixing roller thereon and being operative to move the affixing roller between a pressed position in which the affixing roller is pressed onto the treatment member being fed, to cause the affixing roller to be rotated due to friction with the treatment member being fed, and a standby position in which the affixing roller is moved away from the treatment member;
said affixing roller moving mechanism being configured to move the affixing roller in the standby position to the pressed position onto the treatment member being continuously fed, in a state in which the leading ends of the plurality of bleeder cords arranged by the bleeder cord arranging device are attached to an outer surface of the affixing roller, and to cause the affixing roller to rotate due to friction with the treatment member to thereby press the leading ends of the plurality of bleeder cords onto the treatment member so as to affix and adhere the plurality of bleeder cords continuously to the treatment member, wherein:
the affixing roller is rotatable in one direction only, which is a direction in which the affixing roller is rotated due to the friction with the treatment member, created when the affixing roller is pressed on the treatment member being continuously fed,
a pass roll is supported on the bleeder cord arranging device, to extend in parallel with the affixing roller supported on the affixing roller moving mechanism, at such a disposition that the plurality of bleeder cords arranged in parallel rows by the bleeder cord arranging device are passed on the pass roll prior to the leading ends of the plurality of bleeder cords being attached to the affixing roller, the pass roll being rotatable only in one direction that is same as the direction in which the affixing roller is rotatable,
a one-way clutch is provided to prevent rotation of each of the affixing roller and the pass roll in the one direction thereof, and
the pass roll has stopper rolls thereon, and the stopper rolls are positioned to be in contact with the affixing roller, when the affixing roller is in the standby position, to be prevented from rotation in two directions.

2. The bleeder cord affixing device according to claim 1, wherein the affixing roller has an outer cylindrical surface including circumferentially alternately arranged regions of a low surface roughness and a high surface roughness greater than the low surface roughness.

3. The bleeder cord affixing device according to claim 1, wherein the affixing roller moving mechanism includes a pivot shaft, swing arms having proximal ends rotatably supported by the pivot shaft and extending from the proximal ends to distal ends on which the affixing roller is rotatably supported; the swing arms being swingable to move the affixing roller between the standby position away from the treatment member and the pressed position pressed on the treatment member.

4. The bleeder cord affixing device according to claim 1, wherein the direction in which the treatment member feeding device feeds the treatment member is reverse to the direction in which the plurality of bleeder cords guided and arranged by the bleeder cord arranging device are fed by the rotation of the affixing roller.

5. The bleeder cord affixing device according to claim 4, wherein the pivot shaft of the affixing roller moving mechanism is mounted on the bleeder cord arranging device, and the swing arms extend in a direction including a directional component in which the plurality of bleeder cords guided and arranged by the bleeder cord arranging device are fed by the affixing roller.

6. A bleeder cord affixing device comprising:
a treatment member feeding device for feeding a treatment member in a direction;
an affixing roller disposed to extend in a breadth direction across the direction in which the treatment member is fed;
a bleeder cord arranging device for guiding and arranging a plurality of bleeder cords with leading ends thereof in parallel rows along the direction in which the treatment member is fed;
an affixing roller moving mechanism rotatably supporting the affixing roller thereon and being operative to move the affixing roller between a pressed position in which the affixing roller is pressed onto the treatment member being fed, to cause the affixing roller to be rotated due to friction with the treatment member being fed, and a standby position in which the affixing roller is moved away from the treatment member;
said affixing roller moving mechanism being configured to move the affixing roller in the standby position to the pressed position onto the treatment member being continuously fed, in a state in which the leading ends of the plurality of bleeder cords arranged by the bleeder cord arranging device are attached to an outer surface of the affixing roller, and to cause the affixing roller to rotate due to friction with the treatment member to thereby press the leading ends of the plurality of bleeder cords onto the treatment member so as to affix and adhere the plurality of bleeder cords continuously to the treatment member, wherein:
the affixing roller is rotatable in one direction only, which is a direction in which the affixing roller is rotated due to the friction with the treatment member, created when the affixing roller is pressed on the treatment member being continuously fed, and
a pass roll is supported on the bleeder cord arranging device, to extend in parallel with the affixing roller supported on the affixing roller moving mechanism, at such a disposition that the plurality of bleeder cords arranged in parallel rows by the bleeder cord arranging device are passed on the pass roll prior to the leading ends of the plurality of bleeder cords being attached to the affixing roller, the pass roll being rotatable only in one direction that is same as the direction in which the affixing roller is rotatable; and a bleeder cord cutting device for cutting trailing end portions of the plurality of bleeder cords, which have been affixed to the treatment member by the bleeder cord affixing device; wherein:
the bleeder cord cutting device is provided with a bleeder cord clamping mechanism, including;
pairs of opposing clamping plates between which are passed the trailing end portions of the plurality of bleeder cords extending from the bleeder cord arranging device and affixed to the treatment member, a drive member connected to one of the opposing clamping plates of each pair so as to move the one clamping plate of each pair toward the other clamping plate of each pair to clamp the trailing end portions of the plurality of bleeder cords between the opposing clamping plates of each pair, and a resilient member disposed between the drive member and the one clamping plate of each pair;
the drive member connected to the one clamping plate of each pair has thereon a cutter with a cutting blade directed toward the other clamping plate of each pair and the trailing end portions of the plurality of bleeder cords;
the one clamping plate of each pair is normally made to protrude toward the other clamping plate of each pair beyond the cutting blade of the cutter by a force of the resilient member; and
the bleeder cord clamping mechanism and the cutters are configured to operate such that, when the opposing clamping plates of each pair, clamping the plurality of bleeder cords therebetween, are urged against each other by the operation of the drive member accompanied by compression of the resilient member, the cutting blade of the cutter fixed to the drive member is caused to project beyond the one clamping plate of each pair thereby to cut the plurality of bleeder cords.

7. The bleeder cord affixing device according to claim 6, wherein the one clamping plate of each pair is a movable clamping plate of each pair to be acted upon by the drive member via the resilient member and the other clamping plate of each pair is a stationary clamping plate of each pair; and
the cutter connected to the drive member is adapted to move and project along a lateral side of the movable clamping plate of each pair toward the stationary clamping plate of each pair beyond clamping faces of the movable and stationary clamping plates of each pair.

8. The bleeder cord affixing device according to claim 7, wherein the stationary clamping plate of each pair is rotatable about a support shaft between a first position opposing the movable clamping plate of each pair and a second position not opposing the movable clamping plate of each pair.

* * * * *